United States Patent [19]

Miller et al.

[11] 4,274,296
[45] Jun. 23, 1981

[54] SELF-CENTERING SELF-ALIGNING ANTI-FRICTION ROTOR AND SCREW

[75] Inventors: Lawrence J. Miller, Whittier, Calif.; Raymond W. Born, 4211 First St., Santa Ana, Calif. 92703

[73] Assignee: Raymond W. Born, Santa Ana, Calif.

[21] Appl. No.: 21,626

[22] Filed: Mar. 19, 1979

[51] Int. Cl.$^3$ .............................................. F16H 1/18
[52] U.S. Cl. ................................ 74/424.8 R; 74/441; 74/459
[58] Field of Search ................ 74/424.8 R, 459, 441, 74/465

[56] References Cited

U.S. PATENT DOCUMENTS

| | | | |
|---|---|---|---|
| 3,169,407 | 2/1965 | Newell | 74/424.8 R |
| 3,296,880 | 1/1967 | Maroth | 74/424.8 R |
| 3,308,674 | 3/1967 | Maroth | 74/424.8 R |
| 3,334,526 | 8/1967 | Flarsheim | 74/424.8 R |
| 3,648,535 | 3/1972 | Maroth | 74/424.8 R |
| 3,668,940 | 6/1972 | Avena et al. | 74/424.8 R |
| 3,720,115 | 3/1973 | Vertin | 74/424.6 |
| 3,766,788 | 10/1973 | Metz | 74/459 X |
| 3,766,800 | 10/1973 | Kennedy | 74/424.8 R |
| 3,802,290 | 4/1974 | Grove et al. | 74/459 |
| 4,008,625 | 2/1977 | Malhotra | 74/459 X |

Primary Examiner—C. J. Husar
Assistant Examiner—Conrad Berman
Attorney, Agent, or Firm—Sellers and Brace

[57] ABSTRACT

A self-centering, self-aligning, anti-friction power transmission mechanism comprising a rotor cooperable with a screw to convert rotary movement to linear movement and vice versa. The rotor has one or more convolutions of rollers having their axes arranged in a helical path of the same pitch as the screw thread with their inner ends positioned to have non-scuffing, non-slipping rolling line contact with the screw thread, a result obtained by off-setting each roller axis downwardly along the helix from the line of contact by a distance such that the line of contact and the rotor axis lie in a common plane parallel to the roller axis. The screw thread is preferably of the Acme type with a sidewall taper initially slightly less than the taper of the roller ends in contact therewith whereby, in use under load, the rollers cause cold flow and work hardening of the thread sidewall thereby substantially increasing the length of the line of contact between the rollers and the screw thread.

20 Claims, 6 Drawing Figures

SELF-CENTERING SELF-ALIGNING ANTI-FRICTION ROTOR AND SCREW

This invention relates to anti-friction rotor and screw mechanisms, and more particularly to an improved self-centering, self-aligning anti-friction transmission mechanism for converting rotary movement to linear movement and vice versa with non-scuffing, non-slipping rolling line contact between the rollers and the screw thread.

BACKGROUND OF THE INVENTION

Anti-friction nut and screw mechanisms of a variety of designs have been proposed heretofore in efforts to increase the operating efficiency and to avoid certain shortcomings of prior designs. Constructions of this type are illustrated for example in U.S. Pat. Nos. 3,296,880; 3,648,535; 3,720,115; and 3,802,290. Although these constructions do reduce friction losses and contribute to the operating efficiency of nut and screw mechanisms, all are subject to serious defects and short life owing to various causes including serious wear occuring between the roller elements and the screw. A variety of proposals have been made to obviate these shortcomings but without success. Some of these proposals employ cylindrical roller elements in contact with the sidewall of a square thread, whereas others employ roller elements having contoured ends bearing against the side walls of Acme or modified Acme screw threads. In each of these designs the roller axis is shown and/or described as lying on a radius of the screw or the nut. Despite the foregoing and other expedients, none of these prior proposals for anti-friction screw and nut mechanisms have satisfactory service life and operating characteristics except possibly under low load operating conditions.

SUMMARY OF THE INVENTION

The present invention avoids the foregoing and other shortcomings and disadvantages of prior nut and screw mechanisms and provides a construction capable of operating for long periods under full design load conditions at high efficiency and without scuffing, slippage or accelerated wear of any surface or component. In an illustrative embodiment, the mechanism comprises an elongated screw having an Acme thread embraced by a self-aligning self-centering rotor or nut provided with either a single or multiple helical convolutions of roller elements. The tapered inner ends of these elements have true rolling line contact with the thread sidewall by virtue of having their longditudinal axes parallel to an associated rotor radius but off-set downwardly along the screw thread helix by a distance such that the load bearing line of contact with the thread sidewall is coincident with and lies in the same radial plane as the rotor axis. The magnitude of the downgrade offset varies with the diameters of the rollers, the rotor, and the screw itself, the offset being greater for larger than for smaller diameters of the components.

The rollers are preferably mounted on roller-type anti-friction bearings and are held in a predetermined position by resilient pads and cap screws. True line contact between the rollers and screw sidewalls is provided without need for high tolerance machining operations by the simple expedient of providing the thread sidewall, as manufactured, with a slightly smaller taper angle than the taper of rollers seating thereagainst. When placed in use, high load forces are concentrated at the outer peripheral edge of the thread sidewall. This causes cold flow and work-hardening of the thread sidewall thereby very substantially increasing the length of the line of contact between the roller and the thread wall.

Accordingly, it is a primary object of the invention to provide a screw and rotor mechanism of unique design having greatly increased service life, high operating efficiency, and non-slipping load-bearing line contact between the roller elements and the sidewall of the screw thread.

Another object of the invention is the provision of an improved anti-friction rotor and screw mechanism having a multiplicity of roller elements the axes of which are parallel to a related radius of the screw and offset therefrom sufficiently that the line of contact of the roller and screw thread and the screw axis lie in a common plane.

Another object of the invention is the provision of a self-aligning self-centering anti-friction rotor and screw mechanism having a multiplicity of rollers carried by the rotor axes of which are parallel to but off-set from a radial plane common to the rotor axis and the roller, and in non-slipping line contact with the screw thread.

Another object of the invention is the provision of an improved anti-friction rotor and screw mechanism wherein the sidewall of the screw thread has an initial taper angle slightly less than the tapered end of roller elements in contact therewith by providing for cold flow and work hardening of the thread sidewall during initial operating cycles of the mechanism under load.

These and other more specific objects will appear upon reading the following specification and claims and upon considering in connection therewith the attached drawing to which they relate.

Referring now to the drawing in which a preferred embodiment of the invention is illustrated:

Figures 4, 5, 6:
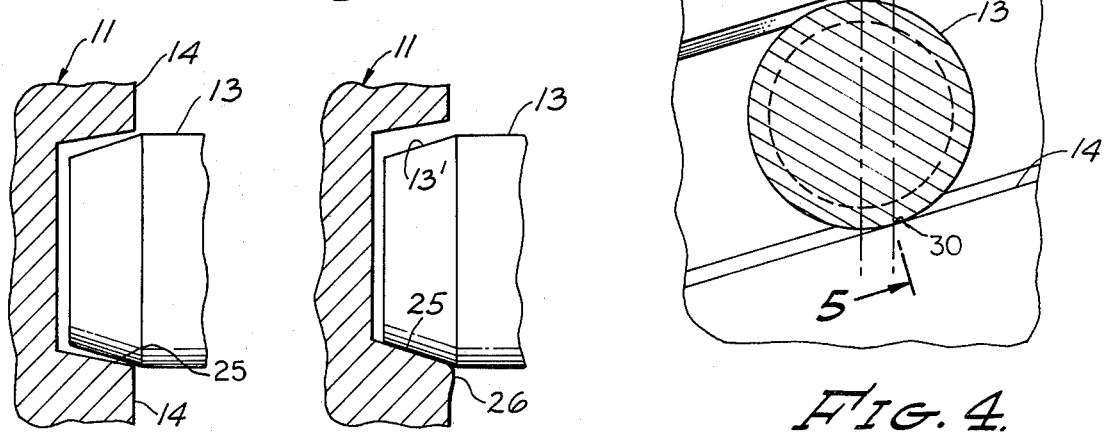
FIG. 4 is a fragmentary cross sectional view taken along line 4—4 of FIG. 3.

FIG. 5 is a fragmentary cross sectional view taken along line 5—5 of FIG. 4 illustrating in greatly exaggerated degree the difference between the taper angle of the rollers and the taper angle of the screw sidewall before the assembly has been operated under load; and FIG. 6 is a view similar to FIG. 5 but showing the screw sidewall deformed by operating load forces to provide substantially continuous line contact between the thread sidewall and the roller elements.

Figures 1, 2:
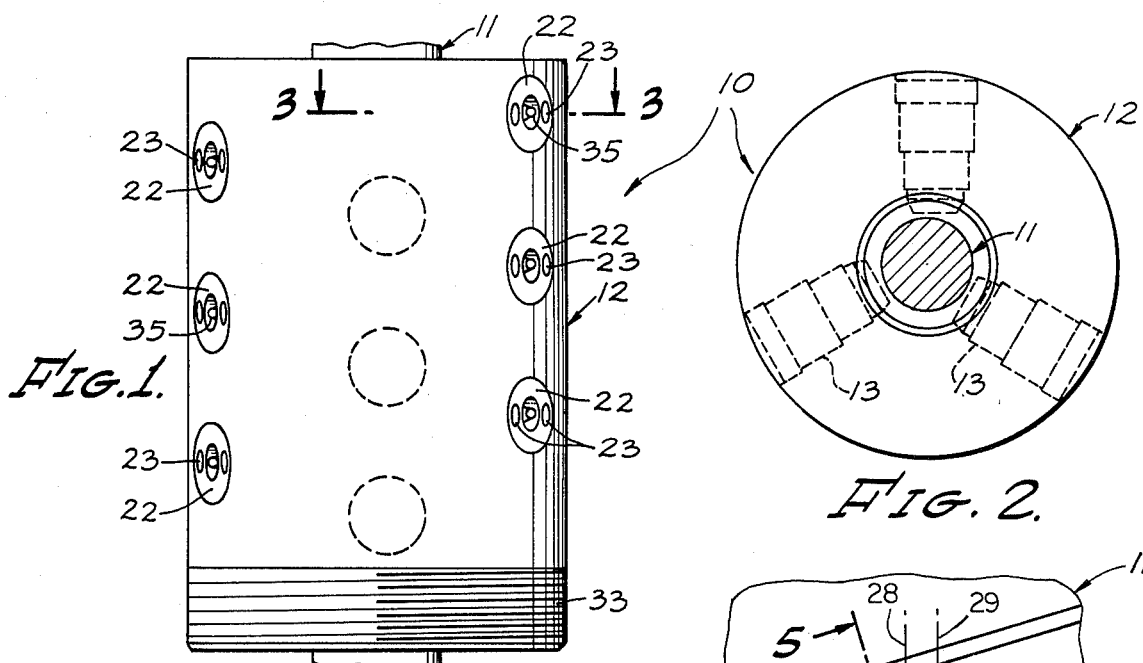
FIG. 1 is an elevational view of an illustrative embodiment of an improved rotor and screw assembly incorporating the features of this invention.
FIG. 2 is a cross sectional view taken immediately above the upper end of the rotor in FIG. 1.

Referring initially and more particularly to FIGS. 1 and 2, there is shown in an illustrative embodiment of the invention, designated generally 10, including a screw 11 surrounded by a nut or rotor 12 equipped with a multiplicity of anti-friction rollers arranged in a helical path having the same nominal pitch as the threads of screw 11. Any suitable number of rollers per convolution may be used depending on the size of the mechanism and the load to be carried. As herein shown by way of example, screw 11 is provided with an Acme thread having a suitable pitch P, as for example 21°.

Figure 3:
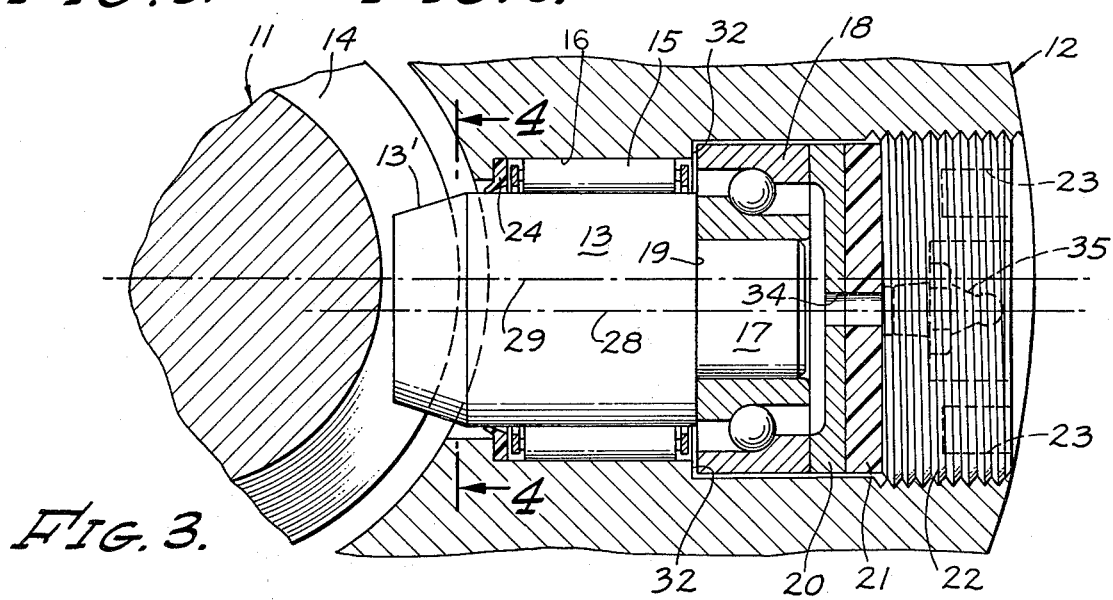
FIG. 3 is a fragmentary cross sectional view on an enlarged scale along line 3—3 of FIG. 1 taken through a typical one of the load bearing roller elements.

FIG. 3 shows each roller element 13 mounted in a roller bearing assembly 15 supported in a non-radial stepped bore 16 through the rotor body. The reduced outer end 17 of the rollers 13 is mounted in anti-friction thrust bearing units 18 the outer raceway of which has a close sliding fit with the juxtaposed wall of bore 16. Interposed between the outer raceway of bearing 18 and the threaded assembly plug 22 is a disc 20 and an elastomeric pad 21 providing a high-load capacity resilient back-up to maintain the inner ends of the rollers 13 in firm load contact with the sidewalls of the screw thread. Roller elements 13, resilient pad 21, and bearing unit 18 are adjustable lengthwise of bore 16 by a threaded closure plug 22 provided with suitable wrench engaging recesses 23 on its outer end (FIG. 1). A resilient seal 24 is located at the forward end of bearing assembly 15 with its lip in wiping contact with roller 13 and serving to exclude dirt and foreign matter while retaining a suitable lubricant captive within bore 16.

The inner ends 13' of rollers 13 are tapered generally similarly to the taper of the sidewall 25 of threads 14 but differing therefrom in an important respect which will now be described by reference to FIGS. 5 and 6. Both screw 11 and rollers 13 are formed from suitable high strength material and the tapered ends 13' of the rollers are finished to high precision. However, the sidewalls 25 of screw threads 14, as initially manufactured and before use, are inclined at an angle slightly less than the bevel angle of tapered ends 13'. This difference in taper angle shown in FIG. 5 is greatly exaggerated for purposes of illustration and to make clear that when mechanism 10 is first placed under load the outer rim edge of the thread sidewalls 25 are placed under high stress. This causes cold flow and work hardening of the thread sidewall and this may and usually does cause an outward bulge in the adjacent surface of the thread land and is indicated at 26 in FIG. 6. In actual practice it is found that if the outer rim edge of the thread sidewall 25 is a few thousandths higher, the cold flow and work hardening taking place when the mechanism is placed under load typically increases the length of the line of contact between the thread sidewall 25 and the tapered end surface 13' of the roller elements to the full axial length thereof.

Referring now more particularly to FIGS. 2, 3 and 4, it is pointed out that a highly important aspect of the invention resides in the fact that each of the roller elements 13 has its axis 28 offset downwardly from and parallel to a radial plane 29 in which plane the screw axis lies. As is best shown in FIG. 4, the axis 28 of rollers 13 is offset parallel to and downwardly from the plane 29 in which the screw axis lies. The amount of downward offset of the rollers is so related to the thread pitch P that the radial line of contact 30 between the bevelled end 13' of the rollers and the thread sidewall 25 lies in the same plane 29 as the thread axis. It is at once apparent that the roller elements are in true rolling contact with the screw thread and that there is no scuffing or slippage at any point along this line of contact.

Preferably and as herein shown, both ends of rotor 12 are open and spaced from the screw lands, the only contact being that provided by rollers 13 with the screw threads. The rotor is self-centering and self-aligning by reason of the cooperative action of the bevelled ends 13' of rollers 13 in contact with the incline sidewalls 25 of the screw threads assisted by the resilient pads 21 normally effective to maintain the rollers pressed inwardly toward the screw axis with tapered ends 13' in firm load-bearing contact with sidewall 25 of the screw threads. In this connection it will be understood that the assembly plug 22 for roller 13 is normally adjusted so that resilient pad 21 and disc 20 hold the outer race of ball bearing assembly 18 seated against shoulder 32 and the inner race of this assembly seated against shoulder 19 of roller 13. The components are so designed that they cooperate and are effective to maintain shoulder 19 spaced from the rotor axis by a predermined distance held constant within a tolerance preferably not exceeding ±0.003 inches. A suitable material for pads 21 is neoprene or the like providing limited resilient cushioning servicing important functions including distribution and compensation for misalignment between the various components under normal and changing load conditions as well as under conditions tending to cock the rotor relative to the screw axis. Other important functions of pads 21 are the equalization of pressure on the thrust bearings so important to their service life and dampening and virtually eliminating any tendency of screw to oscillate due to changes in loading or operating speed. In consequence, it is feasible to eliminate self-aligning bearings heretofore considered essential at the opposite ends of rotor 12.

When the rollers are assembled, plugs 22 are adjusted until the outer race of thrust bearing 18 seats against shoulder 32. After mechanism has been in operation for a short period, the outer race may remain in contact with shoulder 32 or the associated pad 21 may take a set with the bearing race slightly spaced from shoulder 32 as necessary to compensate for minor tolerance variations. At this time all pads will have taken a set and thereupon cooperate in holding rotor 12 sungly centered on screw 11 and in dampening and eliminating any tendency of the screw to oscillate in sharp contrast with operating characteristics of the mechanism when coil springs or the like are employed to urge the rollers into contact with the screw.

As herein shown, the lower end of the rotor 12 is provided with threads 33 to facilitate assembly thereto of a tubular spindle, not shown, but customarily present if rotor 12 is to be rotated about the stationary screw 11. Such a driving spindle is used when the rotor is employed to convert rotary movement to linear movement; in other applications, thread 33 may be used to connect a brake or other component to the rotor if the rotor is held against rotation and the screw is rotated or allowed to rotate thereby shifting the rotor axially of the screw.

Each set of pads 21 and discs 20 is provided with aligned passage 34 for lubricant which is chargeable through a lubricant fitting 35 mounted in each of the threaded plugs 22.

While the particular self-centering self-aligning anti-friction rotor and screw assembly system herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A rotor for use with a threaded shaft to convert rotary movement of one thereof to linear movement of the other comprising:

thick walled tube having an internal diameter larger than a threaded shaft useable therewith;

said tube having a plurality of rollers journalled in and co-axially of non-radial bores extending through the wall thereof and having their axes lying in a helix having the same pitch as the threaded shaft useable with said rotor, the inner ends of said rollers projecting beyond the inner wall of said tube and adapted to have rolling contact with the thread sidewall of a threaded shaft; and the axes of said rollers being offset axially along said helix in the same direction and parallel to a respective radial plane containing the axis of said rotor, the offset distance being so related to the pitch of said helix and the diameter of the inner ends of said rollers that said inner ends are adapted to have non-scuffing rolling contact with the thread sidewall of a threaded shaft.

2. A rotor as defined in claim 1 characterized in that the inner ends of said rollers are bevelled at an angle slightly greater than the initial bevel angle of the thread sidewall of a threaded shaft useable with said rotor.

3. An anti-friction rotor as defined in claim 1 characterized in that the inner end of said rollers are bevelled.

4. A rotor as defined in claim 1 characterized in the provision of not less than three rollers per convolution of said helical path.

5. A rotor as defined in claim 1 characterized in that alternate ones of said helically arranged rollers are adapted to be in load bearing contact with one thread sidewall of a threaded shaft and the other alternate ones of said rollers are adapted to be in load bearing contact with the other sidewall of a threaded shaft thereby to eliminate backlash when said rotor is assembled to a threaded shaft.

6. A rotor as defined in claim 1 characterized in the provision of a multiplicity of anti-friction bearing elements arranged in a ring about each of said rollers, and elastomeric cushioning means carried by said rotor and bearing against the outer end portion of each of said rollers.

7. A rotor as defined in claim 1 characterized in that certain ones of said helically arranged rollers are adapted to be in load bearing contact with one thread sidewall of a threaded shaft and the certain other ones of said rollers are adapted to be in load bearing contact with the other sidewall of a threaded shaft thereby to eliminate backlash when said rotor is assembled to a threaded shaft.

8. A rotor as defined in claim 1 characterized in the provision of thrust bearing means mounted on the outer ends of said rollers including an outer race engageable with stop means on said rotor to limit inward axial movement of said rollers, and resilient means in said bores normally urging said outer race against said stop means.

9. A rotor as defined in claim 8 characterized in that said resilient means comprises an elastomeric disc sandwiched between said outer bearing race and threaded plug means adjustable axially of said bores.

10. An anti-friction transmission mechanism for selectively converting linear movement to rotary movement and linear movement to rotary movement, comprising:
a screw having a helical thread;
a rotor encircling said screw having at least one convolution of anti-friction rollers journalled in and co-axially of non-radial bores arranged in a helical path having the same pitch as said helical screw thread, the inner ends of each of said rollers projecting into and making a respective line-contact with the sidewall of said helical screw thread;
and the axes of said rollers being parallel to a respective radius of said rotor and offset in the same direction therefrom by a distance such that each of said lines of contact and the rotor axis lie substantially in a respective common radial plane.

11. An anti-friction transmission mechanism as defined in claim 10 characterized in that said helical screw thread is an Acme-type thread, and the inner ends of said rollers being tapered similarly to the taper of the sidewall of said Acme thread.

12. An anti-friction transmission mechanism as defined in claim 11 characterized in the provision of axially adjustable resilient thrust means for each of said rollers urging the latter inwardly with the inner ends thereof spaced a predetermined distance from the axis of said rotor.

13. An anti-friction transmission mechanism as defined in claim 11 characterized in that the taper angle of the sidewall of said Acme thread as initially made and before being operated in load-bearing contact with said rollers is slightly less than the taper angle of the inner ends of said rollers whereby load bearing operation of said mechanism causes cold flow of the outer portion of said thread sidewall and the work-hardening thereof to substantially increase the length of the load bearing line of contact between said rollers and the sidewall of said screw thread.

14. An anti-friction transmission mechanism as defined in claim 11 characterized in the provision of resilient thrust means acting against the outer end of said rollers and effective to maintain said rollers seated in rolling contact with said Acme thread and substantially at a predetermined distance from the axis of said screw.

15. An anti-friction transmission mechanism as defined in claim 14 characterized in that each of said thrust means includes a thrust bearing embracing the outer end of a roller, a rigid disc resting against said thrust bearing, a thick elastomeric pad resting against said disc, and an adjustable plug resting against the outer face of said pad.

16. An anti-friction transmission mechanism comprising:
a screw having an Acme thread extending helically thereof;
a rotor encircling said screw having at least one convolution of anti-friction rollers journalled therein in a helical path having the same pitch as said helical screw thread with their inner tapered ends projecting into said helical screw thread and making line contact with the sidewall thereof; and
the sidewall of said screw thread in contact with said rollers, before use, being tapered at an angle slightly less than the taper angle of said rollers whereby the initial operation of said mechanism under load causes said rollers to produce cold flow of a portion of said thread sidewall to work-harden said sidewall and to increase the length of the line of contact of said rollers with said thread sidewall.

17. An anti-friction transmission mechanism as defined in claim 16 characterized in the provision of axially-adjustable resilient elastomeric pad means for holding each of said rollers substantially at a predetermined distance from the axis of said screw with the inner ends of said rollers firmly seated against the sidewall of said Acme thread.

18. An anti-friction transmission mechanism as defined in claim 16 characterized in that the axes of said rollers are offset in the same direction from a parallel to a respective radial plane containing the axis of said screw, the offset being such that the inner ends of said rollers have true rolling line contact with said Acme thread.

19. An anti-friction rotor adapted to be assembled in rolling engagement with the sidewall of a helical screw groove comprising:

a rotor having a tubular main body provided with a multiplicity of non-radial bores through the wall thereof with their axes lying in a helical path axially of said tubular body and parallel to and similarly offset axially of said helix from and parallel to a respective diametric plane of said rotor;

roller means journalled in and co-axially of said bores and protruding from the inner ends thereof adapted to have load bearing contact with the sidewall of a helical screw groove having the same pitch as the pitch of the helical path of said bores; and the offset of said bore axes from the aforesaid respective diametric planes being such that the rotor axis and the lines of load bearing contact of the inner ends of said rollers when the inner ends thereof are in load bearing contact with the sidewall of a helical screw groove will lie in respective non-radial planes.

20. A rotor as defined in claim 19 characterized in that certain ones of said helically arranged rollers are adapted to be in load bearing contact with one thread sidewall of a threaded shaft and the certain other ones of said rollers are adapted to be in load bearing contact with the other sidewall of a threaded shaft thereby to eliminate backlash when said rotor is assembled to a threaded shaft.

* * * * *